US011828534B2

(12) United States Patent
Li et al.

(10) Patent No.: US 11,828,534 B2
(45) Date of Patent: Nov. 28, 2023

(54) NATURAL RUBBER INITIAL PROCESSING MACHINERY AND METHOD

(71) Applicant: Natural Rubber Technology (HK) Co., Ltd., Hongkong (CN)

(72) Inventors: Lu Li, Qld (AU); Xiao Dong Liu, Dalian (CN)

(73) Assignee: Natural Rubber Technology (HK) Co. Ltd, Mongkok (HK)

( * ) Notice: Subject to any disclaimer, the term of this patent is extended or adjusted under 35 U.S.C. 154(b) by 264 days.

(21) Appl. No.: 17/111,483

(22) Filed: Dec. 3, 2020

(65) Prior Publication Data

US 2021/0088281 A1   Mar. 25, 2021

Related U.S. Application Data

(60) Continuation-in-part of application No. 16/695,105, filed on Nov. 25, 2019, now abandoned, which is a continuation of application No. 15/339,875, filed on Oct. 31, 2016, now Pat. No. 10,533,801, which is a division of application No. 13/200,210, filed on Sep. 20, 2011, now Pat. No. 9,517,575.

(51) Int. Cl.
| F26B 17/20 | (2006.01) |
| B29B 13/06 | (2006.01) |
| B01J 2/20 | (2006.01) |
| F26B 5/14 | (2006.01) |
| B30B 9/12 | (2006.01) |
| B29K 7/00 | (2006.01) |
| B29K 105/00 | (2006.01) |

(52) U.S. Cl.
CPC ............... *F26B 17/20* (2013.01); *B01J 2/20* (2013.01); *B29B 13/06* (2013.01); *B30B 9/12* (2013.01); *F26B 5/14* (2013.01); *B29K 2007/00* (2013.01); *B29K 2105/0064* (2013.01)

(58) Field of Classification Search
CPC ..... B29C 33/405; B29C 48/767; B29C 48/64; F26B 3/00; F26B 1/00; F26B 5/14; F26B 17/20; B01J 2/20; B30B 9/12; B29B 15/04; B29B 13/06
See application file for complete search history.

(56) References Cited

FOREIGN PATENT DOCUMENTS

CN         101348532      *   1/2009

* cited by examiner

*Primary Examiner* — Stella K Yi
(74) *Attorney, Agent, or Firm* — Raymond Y. Chan; David and Raymond Patent Firm

(57) ABSTRACT

A conveyance unit mounted to a machine for initial processing of natural raw rubber into aged rubber product, includes: a discharge delivery belt connected with the machine to receive the aged rubber product; a vibration delivery device connected to the discharge delivery belt to selectively delivery the aged rubber product from the discharge delivery belt; a drying and cooling device, comprising an elongated channel body and a circulation system mounted therein, wherein the rubber product is entered from one end of the elongated channel body while being dewatered and left from the other end of the elongated channel body, wherein the circulation system is operated to provide wind inside the elongated channel body for drying and cooling the rubber product; and a cutting device connected to the elongated channel body of the drying and cooling device to cut the dried rubber product into aged product.

18 Claims, 11 Drawing Sheets

NATURAL RUBBER INITIAL PROCESSING MACHINERY AND METHOD

CROSS REFERENCE OF RELATED APPLICATION

This is a Continuation-In-Part application that claims the benefit of priority under 35 U.S.C. § 120 to a non-provisional application, application Ser. No. 16/695,105, filed Nov. 25, 2019, which is a Continuation application that claims the benefit of priority under 35 U.S.C. § 120 to a non-provisional application, application Ser. No. 15/339,875, filed Oct. 31, 2016, which is a Divisional application that claims the benefit of priority under 35 U.S.C. § 120 to a non-provisional application, application Ser. No. 13/200,210, filed Sep. 20, 2011, wherein the entire content of which are expressly incorporated herein by references.

BACKGROUND OF THE PRESENT INVENTION

Field of Invention

The present invention relates to a method of initial processing of natural rubber and its machinery, and more particularly to a method of aging (drying) natural rubber which employs an automate machinery with additional conveyance unit for mass production to produce high grading natural rubber products with reduced energy consumption and shortened time period.

Description of Related Arts

Rubber is a key industrial raw material which leads to the fast-growing development of synthetic rubber. However, while natural rubber has several characteristics which are not replaceable by synthetic rubber, the technological development of initial processing of natural rubber fails to keep pace with the present needs. It is worth mentioning that the physical properties of synthetic rubber can never match that of natural rubber.

Nowadays, natural rubber mainly originates from Southeast Asia and southern China. Technological research and development, which is led by western developed countries, merely concentrate on application of natural rubber or on synthetic rubber and fail to put focus on the machineries and technologies for initial processing of natural raw rubber. Accordingly, the overall technological development of initial processing of natural raw rubber is not up-to-date in view of the contemporary technological development. It is worth mentioning that natural raw rubber is a completely amorphous polymer which is highly valuable for a vast variety of potential useful applications, which may not be met by using synthetic rubber. Therefore, there is an urgent need to advance the technological development for initial processing of natural rubber.

Conventional natural rubber initial processing has several major drawbacks. First, it fails to produce high quality rubber materials efficiently and satisfactorily. Second, it fails to provide even and thorough drying or aging for the rubber. Third, it fails to provide sufficiently high level of drying for the rubber. Fourth, it doesn't fit for automate processing. Fifth, it requires a relatively long time period to complete the process. Sixth, the shape and size of final products are restrictive, owing to the limitation of large surface area to volume ratio requirement and the corresponding energy consumption. Seventh, if shape and size of final products of small surface area to volume ration is desired, the energy consumption is great and a large volume of pollutants are emitted, which is highly environmentally unfriendly.

Especially for processing the natural rubber to obtain better performance after aging, it is important to dry and dewater the rubber in time. Otherwise, the processed rubber will lose its best time to be final product. Also, it is important to check whether the processed rubber meets all requirements, in case the rubber needs re-processed before further drying or packaging.

SUMMARY OF THE PRESENT INVENTION

The invention is advantageous in that it provides a drying process for initial processing of natural raw rubber to produce a high quality final product with flexibilities in form, shape and additives.

Another advantage of the invention is to provide a drying process for initial processing of natural raw rubber to produce a final product of initial processed natural raw rubber which is uniform in texture and drying level with flexibilities in form, shape and additives.

Another advantage of the invention is to provide a machine for initial processing of natural raw rubber to produce a final product of initial processed natural raw rubber which is uniform in texture and drying level with flexibilities in form, shape and additives.

Another advantage of the invention is to provide a machine for initial processing of natural raw rubber, which employs a drying process which is capable of utilizing the temperature and pressure increase of the rubber itself under the condition inside the machine, providing mixing and heating effect at a particular point of the machine, and fulfilling aging requirements through the squeezing effect and additional heating at the nozzle, thereby minimizing energy consumption while increasing the quality standard of the final product.

Another advantage of the invention is to provide a machine for initial processing of natural raw rubber to provide an automate drying process to facilitate mass production in an energy saving, time efficient and quality-wise manner.

Another advantage of the invention is to provide a machine for initial processing of natural raw rubber with additional conveyance unit, which is capable of drying the rubber product efficiently and minimizing cooling time.

Another advantage of the invention is to provide a machine for initial processing of natural raw rubber with additional conveyance unit, which provides additional process to further dewater the rubber in time.

Another advantage of the invention is to provide a machine for initial processing of natural raw rubber with additional conveyance unit, wherein the conveyance unit is easily to be positioned and connected with the machine to save time for products transition.

Another advantage of the invention is to provide a machine for initial processing of natural raw rubber with additional conveyance unit, wherein the rubber is further dewatered to obtain better performance before being packaged.

Additional advantages and features of the invention will become apparent from the description which follows, and may be realized by means of the instrumentalities and combinations particular point out in the appended claims.

According to the present invention, the foregoing and other objects and advantages are attained by a conveyance unit mounted to a machine for initial processing of natural raw rubber into aged rubber product, comprising:

a discharge delivery belt connected with the machine to receive the aged rubber product;

a vibration delivery device connected to the discharge delivery belt to selectively delivery the aged rubber product from the discharge delivery belt;

a drying and cooling device, comprising an elongated channel body and a circulation system mounted therein, wherein the rubber product is entered from one end of the elongated channel body while being dewatered and left from the other end of the elongated channel body, wherein the circulation system is operated to provide wind inside the elongated channel body for drying and cooling the rubber product; and a cutting device connected to the elongated channel body of the drying and cooling device to cut the dried rubber product into aged product.

According to the present invention, the foregoing and other objects and advantages are attained by a drying process for initial processing of natural raw rubber comprising the steps of:

(a) providing a coagulated latex, wherein the coagulated latex contains water and volatile compositions; (b) dewatering the coagulated latex through a screw-pressing process such that free water is removed; (c) forming a first pretreated latex material; (d) aging the first pretreated latex material through an aging process such that water and volatile compositions are removed; and (e) forming an aged product of aged latex material. Preferably, the process further comprises a step of (f) cooling the aged product of aged latex material.

In the step (b), the screw-pressing process comprises the steps of: (b.1) cutting, pressing and mixing the coagulated latex while transporting the coagulated latex in an elongated channel structure from a first end to a second end of the elongated channel structure such that temperature and pressure of the coagulated latex increase while transporting from the first end to the second end to build a pressure gradient between the first end and the second, thereby free water is removed through provision of the pressure gradient.

In the step (d), the aging process comprises the steps of: (d.1) cutting, pressing and mixing the first pretreated latex material while transporting the first pretreated latex material in an elongated channel structure of an aging machine from a first end to a second end of the elongated channel structure of the aging machine such that a pressure of the first pretreated latex material is increased to a sufficiently high level at which a pressure requirement of aging is fulfilled while a temperature of the first pretreated latex material is increased to a high level at which a temperature requirement of aging is fulfilled if additional heating is provided; and (d.2) providing heating at the second end of the elongated channel structure of the aging machine such that the temperature requirement of aging is fulfilled while squeezing the first pretreated latex material out of the second end of the elongated channel structure of the aging machine, whereby the first pretreated latex material undergoes the aging process once both the pressure requirement and the temperature requirement of aging are met, thereby water and volatile compositions in the first pretreated latex material are removed while the aged latex formed has a uniform texture. Preferably, after the step (d.2), the process further comprises a step of: (d.3) cutting the aged latex into pieces to increase a surface area to volume ratio to facilitate cooling, wherein the aged product of aged latex material is in granular form.

Preferably, before step (d), the process further comprises a step of: (d') adding a preset additive to the first pretreated latex material. Accordingly, based on the particular requirement of the aged product of processed raw rubber, one or more additives may be thoroughly mixed and added into the raw rubber. In other words, the additive is uniformly provided in the aged product of aged latex material.

In accordance with another aspect of the invention, the present invention is a machine for initial processing natural raw rubber comprising: a de-watering machine powered through a motor connecting to a reducer unit for providing a two-step de-watering process, comprising a vibration screen having first and second ends arranged for carrying out a first step of the two-step de-watering process, wherein coagulated latex granules are provided to the first end of the vibration screen which are then guided to transport from the first end to the second end of the vibration screen while going through the first step of dewatering process through the vibration screen; and a pressing screen connected to the vibration screen arranged for carrying out a screw-pressing process, wherein the pressing screen has an elongated body defining a pressing channel between first and second ends inside the elongated body, and comprises a screw unit inside the pressing channel and a nozzle operatively communicated with the screw unit provided at the second ends, wherein the latex granules received from the vibration screen are guided to propel and compress along the screw unit from the first end through the second end such that a pressure gradient between the first and second ends are built, defining a low pressure area towards the first end and guiding free water contained in the latex granules to flow towards the first end from the second end while transporting from the first end to the second end, wherein the latex granules are squeezed out of the pressing channel through the nozzle at the second end of the pressing screen such that the free water contained in the latex granules is further removed, resulting a first dehydrated latex; and an aging machine powered though a main motor connecting to a reducer unit and connected to the de-watering machine, comprising an aging unit having a first end and a second end which defines an aging channel, and comprising a screw shaft unit extended between the first end and the second end inside the aging channel which has a plurality of cutting threads provided thereon; a nozzle provided at the second end of the aging unit; and a heating unit positioned at the second end of the aging unit positioned adjacent to the nozzle of the aging unit, whereby the first dehydrated latex starts an aging process and an aged product of a second-stage processed latex material is resulted when both temperature and pressure requirements are met at the nozzle.

When the first dehydrated latex entered into the aging machine, the first dehydrated latex is being pressed and cut through the screw shaft unit while propelling along the screw shaft unit from the first end to the second end of the aging unit, resulting in volatile compositions contained in the first dehydrated latex being gasified. Also, pressure requirement for aging is met at the second end of the aging channel by pressing and cutting of the first dehydrated latex through the screw shaft, while a temperature requirement is met when temperature is increased by pressing and cutting of the first dehydrated latex through the screw shaft, which is further increased by squeezing through the nozzle of the aging unit and heating by the heating device provided adjacent to the nozzle of the aging unit. Accordingly, free water and volatile compositions contained in the first dehydrate latex are removed when the first dehydrate latex is decompressed at a position around the nozzle outside the aging channel.

Preferably, the machine also includes a cutting unit provided to the nozzle outside the aging channel which is arranged for cutting the second-stage processed latex material by the cutting unit to form an aged product of latex granules such that a surface area to volume ratio is increased at a position around the nozzle outside the aging channel for speeding up the aging process and to facilitate removal of volatile compositions and water.

In accordance with another aspect of the invention, the present invention is a machine for initial processing natural raw rubber, which is a single-unit machine powered by a motor connecting to a reducer unit through a coupling device, comprising:

an elongated body having a first end and a second end, defining a channel between the first end and the second end;

a hopper unit provided at a first end of the aging unit, arranged for feeding latex granules into the channel of the elongated body of the aging unit;

a screw shaft unit coaxially provided inside the channel, arranged for removing free water from the latex granules through screw-pressing around the first end to form a latex material and guiding the latex material to propel along the screw shaft unit from the first end towards the second end in such a manner that temperature and pressure are increased while propelling towards the second end and a pressure gradient along the channel is built, defining a low pressure area towards the first end inside the channel and fulfilling a pressure requirement for aging process at the second end inside the channel;

a water exit opened towards the first end of the elongated body at which the low pressure area is defined, arranged for draining the free water outside the channel of the aging unit;

a body heating unit provided on the elongated body of the aging unit, arranged for heating the latex material such that a temperature of the latex material is increased to a level which is slightly lower than a temperature at which a temperature for aging process is met;

a nozzle provided at the second end of the aging unit cooperatively communicated with the screw shaft unit, arranged for squeezing the latex material outside the channel; and a nozzle heating device positioned adjacent to the nozzle outside the channel for heating the latex material while the latex material are squeezed outside the channel such that the temperature requirement for aging process is just met for starting the aging process, thereby volatile compositions and water contained in the latex material are removed, forming an aged product of a processed latex material.

Preferably, the machine further includes a cutter unit around the nozzle outside the channel such that the latex material is cut into granular form while having the aging process around the nozzle outside the channel of the aging unit.

Preferably, the elongated body comprises a tubular body portion at the first end and a flat body portion at the second end, wherein the tubular body portion has an inclined bottom surface and the water exit is provided in the bottom surface of the tubular body portion, so that when the latex material is propelled along the screw shaft unit from the first end towards the second end, free water contained in the latex material is eliminated from the water exit along the bottom surface of the tubular body portion, and the latex material is then propelled from the tubular body portion into the flat body portion to undergo the aging process.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
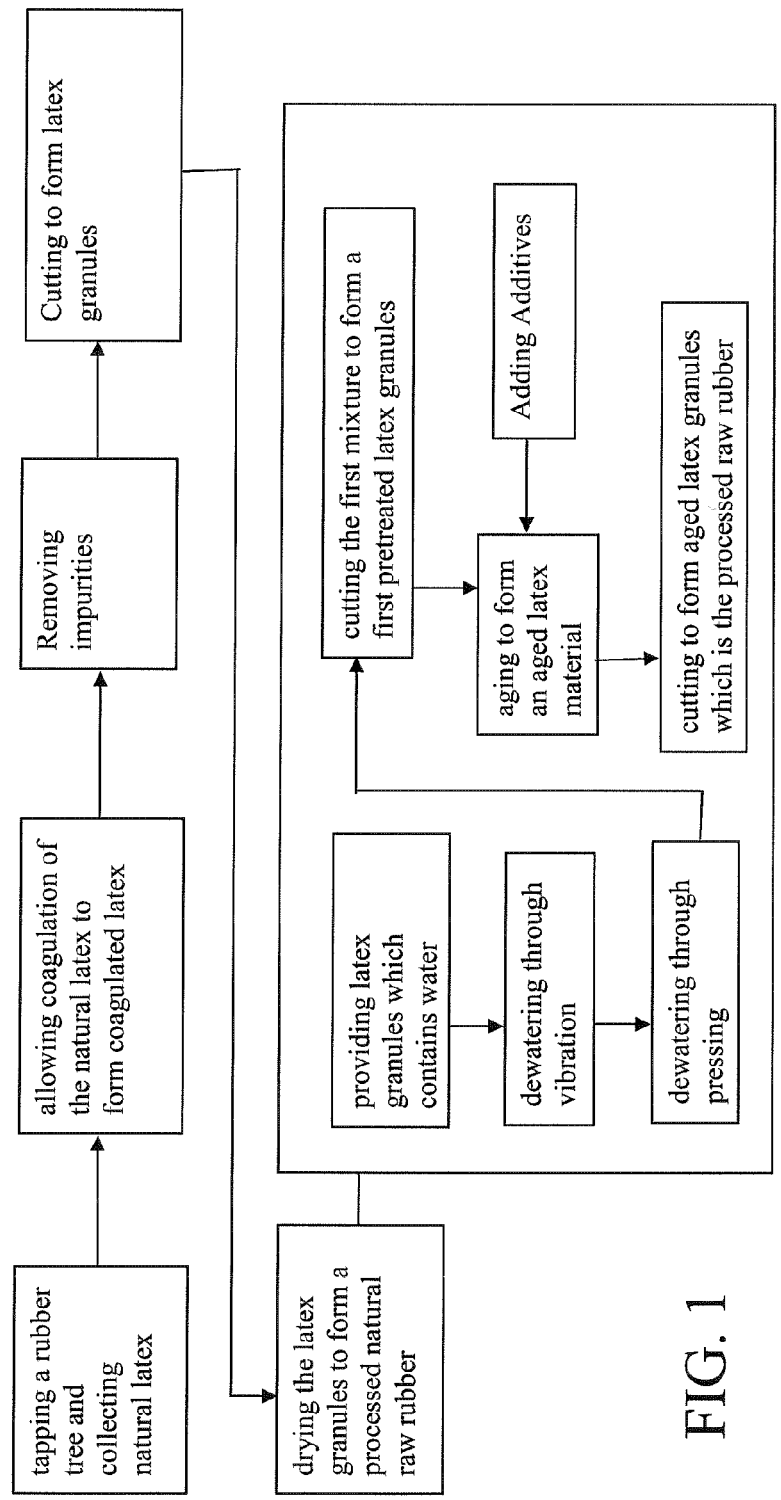
FIG. 1 is a schematic diagram of a process of initial processing of natural rubber according to a preferred embodiment of the present invention.

Referring to FIG. 1 of the drawings, a process of initial processing of natural rubber according to a preferred embodiment of the present invention comprises the steps of:

(I) cutting or tapping a rubber tree at a preset position to create a latex flow and collecting the latex, namely the natural latex;

(II) allowing coagulation of the natural latex which is collected in step (a) to form coagulated latex;

(III) removing impurities from the coagulated latex;

(IV) carrying out granulation for the coagulated latex to form latex granules; and (V) drying the latex granules to form a processed natural raw rubber.

The processed natural raw rubber is then classified and graded according to industry standard which is then ready for packaging and further processing or use.

It is worth mentioning that steps (I) and (II) are usually carried in the field and therefore step (III) is required before granulation and drying of the coagulated latex. The coagulated latex is made into granules such that surface area to volume ratio is increased and hence the time of drying is shortened.

In particular, the present invention is focused on step (V), which is: drying the latex granules to form a processed natural raw rubber. Conventional drying process is carried out through air-drying, hot-drying or smoke-drying in a conveyance belt or in a smokehouse. However, in the following description of the present invention, drying is in fact a unique aging process which is different from the convention drying process.

In the conventional drying process in which air, hot-air or smoke is the medium for drying the latex granules, the problem of incomplete and uneven drying is observed. The effect of drying is dependable on the size and form of latex and therefore a large surface area to volume ratio of the latex for drying is required. While less effective drying for latex sheet is not a particular great problem for low-graded natural raw rubber, granule form is the only option for high-graded natural raw rubber. The drying process of the present invention, which employs a unique aging process, is capable of solving the problem of incomplete or uneven drying while providing high-grade natural raw rubber in a variety of sizes or forms to facilitate further processing or application of the natural raw rubber.

It is worth mentioning that the conventional process of drying for latex sheet, which has a relatively low surface area to volume ratio, requires at least four to fifty days. The conventional process of drying for latex granule, which has a relatively large surface area to volume ratio, requires two to eight hours, but the drying effective is ineffective. The initial processing of the present invention not only shorten the time period required, but also produces an effective drying effect for latex materials of different forms or sizes.

In other words, the present invention provides a method of drying through an aging process to produce a processed natural raw rubber, comprising the steps of:

(a) providing the coagulated latex which contains water, preferably in the form of latex granules;
(b) pumping the coagulated latex to a buffer tank;
(c) dewatering the coagulated latex through vibration;
(d) dewatering the coagulated latex from step (c) through screw-pressing;
(e) cutting the coagulated latex from step (d) to form a first pretreated latex granules;
(f) aging the first pretreated latex granules from step (e) to form an aged latex; and
(g) cutting the aged latex from step (f) to form aged latex granules.

It is worth mentioning that the aging process of the present invention is a fully automated process for mass production of latex granules of high quality. Furthermore, additives can be added to the first pretreated latex granules to undergo the aging process such that the additives can be added into and mixed thoroughly with the aged latex granules.

Figure 2:
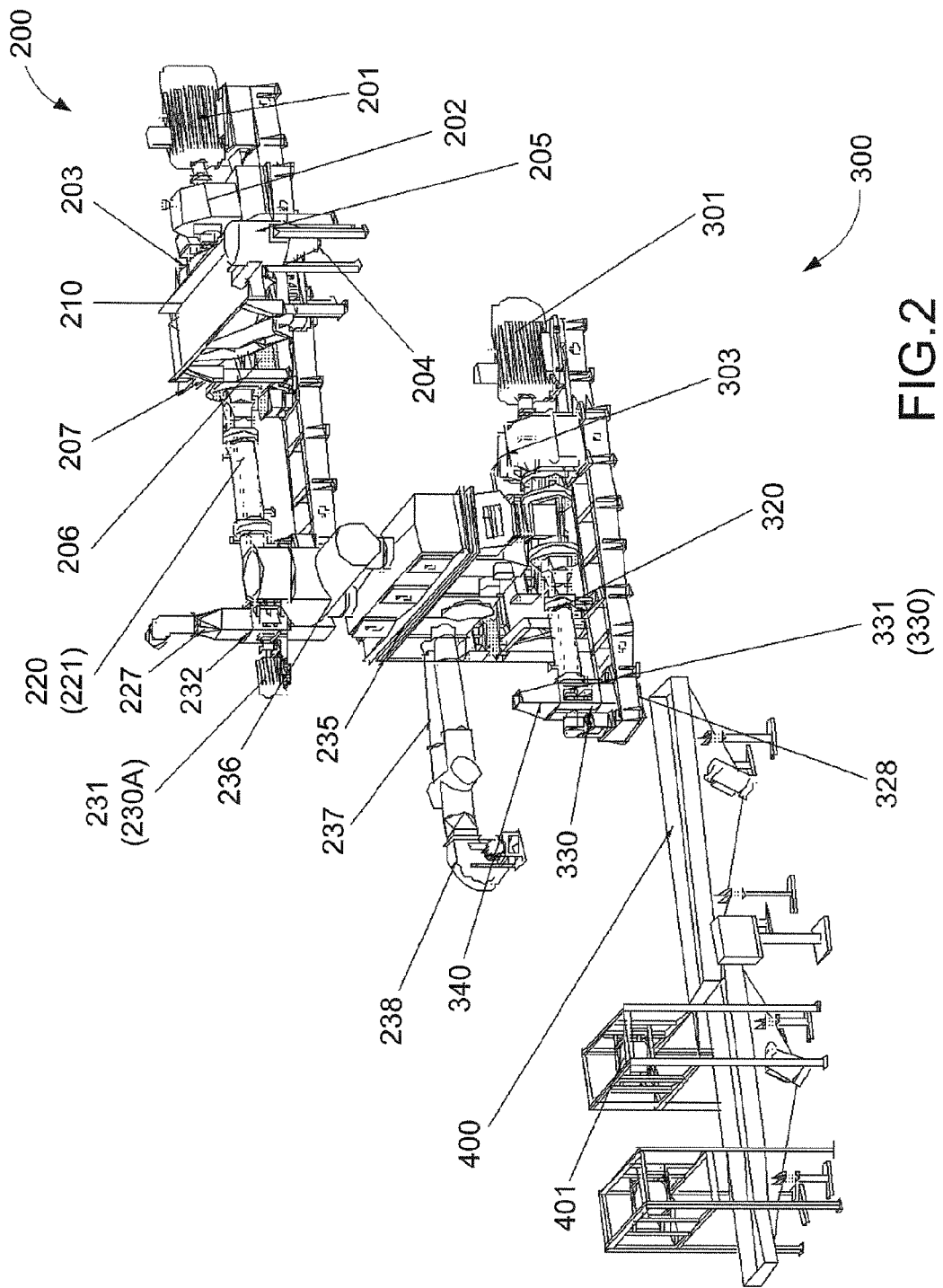
FIG. 2 is an illustration of an initial processing machine for natural rubber according to the above preferred embodiment of the present invention.
Figure 3A:
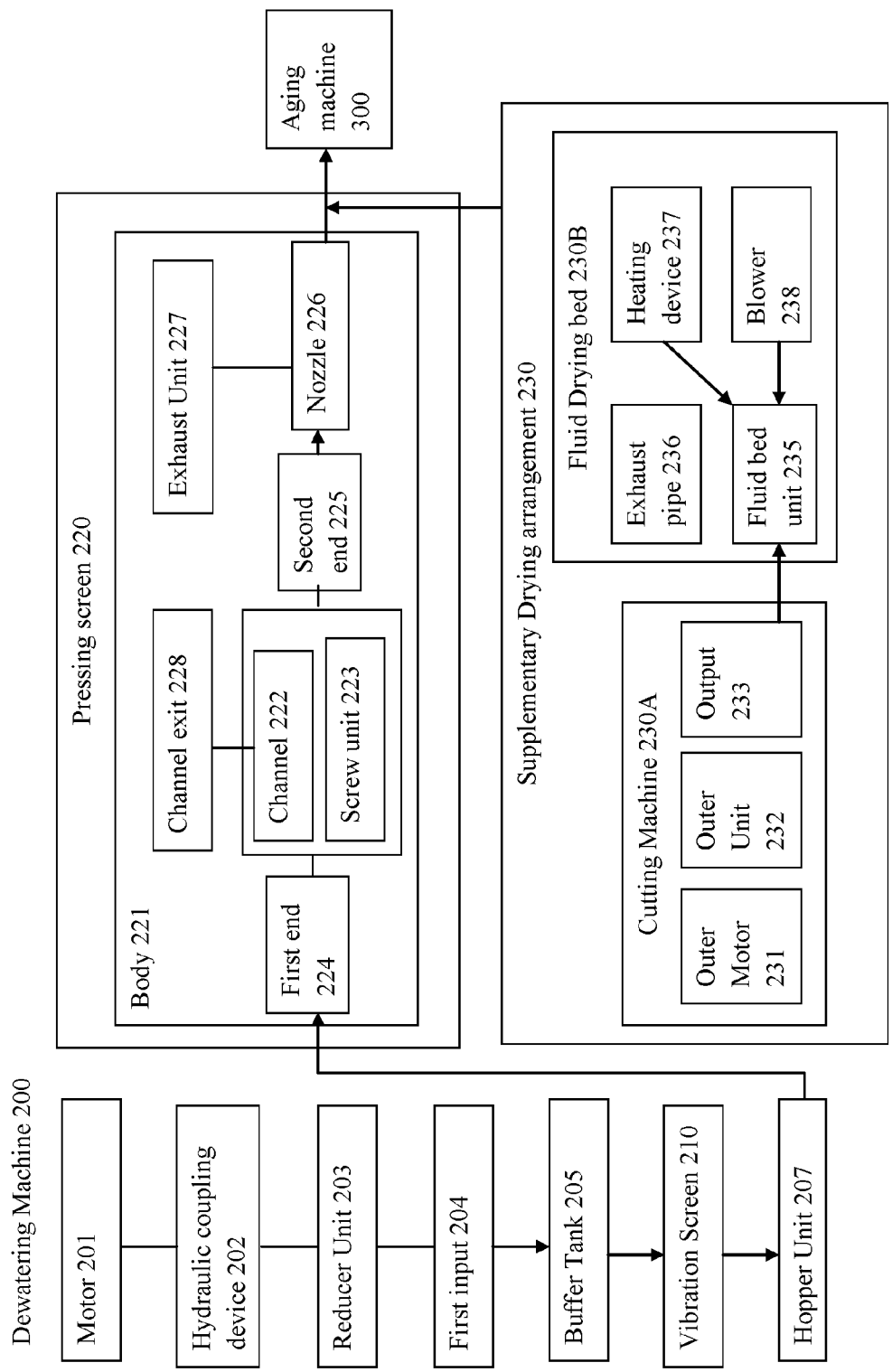
FIGS. 3A and 3B is a schematic diagram of an initial processing machine for natural rubber for carrying out a process of initial processing of natural rubber according to the above preferred embodiment of the present invention.
Figure 3B:
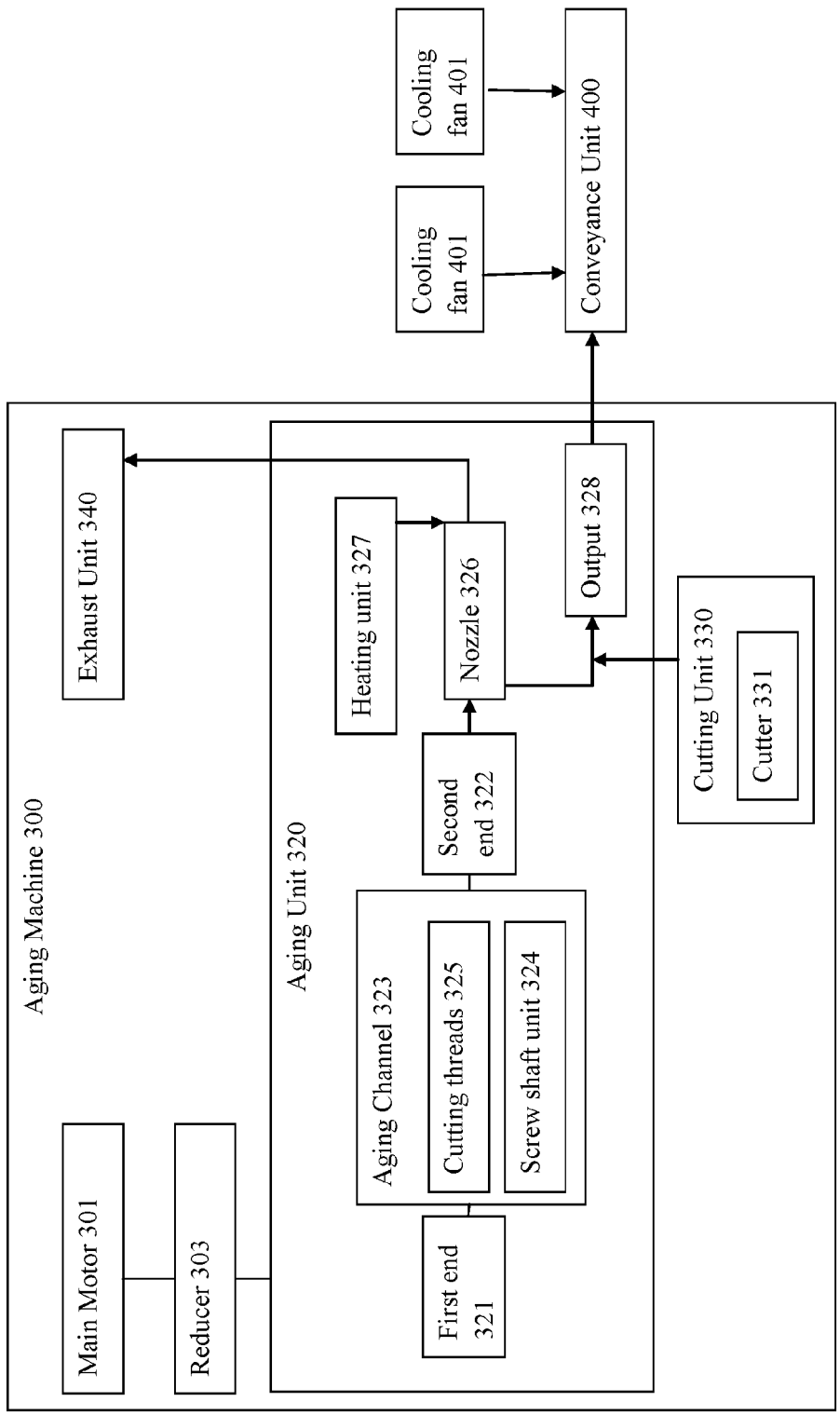

Referring to FIG. 2 of the drawings, an initial processing machine for natural rubber which is used to carrying out an automated process of initial processing of natural rubber according to a preferred embodiment includes a de-watering machine 200 and an aging machine 300.

The de-watering machine 200, which is powered through a main motor 201 connecting to a reducer unit 203 through a hydraulic coupling device 202, comprises a vibration screen 210 and a pressing screen 220 for providing a two-step de-watering process through vibration and squeezing. In particular, the de-watering machine 200 comprises a first input 204, a buffer tank 205 connecting between the first input 204 and the vibration screen 210, a water receiving tank 206 provided at a position below the vibration screen 210, and a hopper unit 207 connecting between the vibration screen 210 and the pressing screen 220. Accordingly, coagulated latex granules enter into the de-watering machine 200 through the first input 204, which is then pumped to the vibration screen 210 such that water is removed from the coagulated latex granules and collected by the water receiving tank 206. Then, the coagulated latex granules are transported to the hopper unit 207, which is also the entrance of the pressing screen 220, to enter into the pressing screen 220 where the coagulated latex granules are squeezed and deformed while water is removed effectively from the coagulated latex granules.

The pressing screen 220 has an elongated body 221 having a pressing channel 222 therein, comprising a screw unit 223 extended between a first end 224 and a second end 225 of the body 221, a channel exit 228 provided around the first end 224 of the body 221, a nozzle 226 provided at the second end 225 of the body 221, and an exhaust unit 227 opened to outside. Free water is removed from the latex granules through the pressing screen 220.

In particular, the latex granules are propelled and compressed along the screw unit 223 from the first end 224 to the second end 225 while a pressure and a temperature are increased accordingly. Therefore, a pressure gradient between the first end 224 and the second end 225 are built such that free water in the latex granules flow from high pressure area towards low pressure area, which is from the second end 225 towards the first end 224, and is then guided to exit through the channel exit 228 at the first end 224. On the other hand, when the latex granules reach the second end 225 through the screw unit 223, pressure and temperature have reached a greater level. Accordingly, owing to the sudden increase in volume and hence the dramatic decrease in pressure when the latex granules reach the second end 225 and are ejected out of the pressing channel 222 through the nozzle 226, water and other volatile composition contained in the latex granules are released or removed effectively from the latex granules and a first dehydrated latex is resulted. The moisture containing water and other volatile composition is then exhausted through the exhaust unit 227.

Preferably, the de-watering machine 200 further comprises a supplementary drying arrangement 230 which includes a cutting machine 230A powered through a cutting motor 231, and a cutter unit 232 arranged for cutting the first dehydrated latex into granules, namely first-staged dehydrated latex granules; and a fluid bed dryer 230B connected to an output 233 of the cutting machine 230A for drying the first-staged dehydrated latex granules before proceeding to the aging machine 300. It is worth mentioning that preparing the first-staged dehydrated latex granules through the cutting machine 230A can result in an increase in surface area and hence the evaporation rate of water such that water can be removed more effectively from the first-staged dehydrated latex granules. The fluid bed dryer 230B is used to providing supplementary drying for the first-staged dehydrated latex granules before entering into the aging machine 300. In particular, the fluid bed dryer 230B comprises a fluid bed unit 235 for providing a vibrating bed for the first-staged dehydrated latex granules, a heating device 237 and a blower 238 for generating hot air to the fluid bed unit 235, and an exhaust pipe 236 for air exit. In other words, the fluid bed dryer 230B supplies heated air to increase the temperature and to carry away any volatile gas or water from the first-staged dehydrated latex granules, which is then exited through the exhaust pipe 236.

The aging machine 300 is arranged for further removing free water from the latex the first-stage dehydrated latex granules through screw press dewatering mechanism. In particular, the aging machine 300, which is powered through a main motor 301 and connecting to a reducer unit 303, comprises an aging unit 320 having a first end 321 and a second end 322 between which an aging channel 323 is defined, and comprising a screw shaft unit 324 extended between the first and second ends 321, 322 inside the aging channel 323, a plurality of cutting threads 325 on the screw shaft unit 324, a nozzle 326 provided at the second end 322, a heating unit 327 at the second end 322 of the aging unit 320 arranged for adjusting a temperature of the first-stage dehydrated latex granules at the nozzle 326, and an output 328 serving as an exit of the aging machine 300.

In particular, the first-stage dehydrated latex granules are being pressed and both pressure and temperature increase during the process when the first-staged dehydrated latex granules propels along inside the aging channel 323 of the aging unit 320. Therefore, volatile compositions contained in the first-stage dehydrated latex granules are gasified and propel together with the dehydrated latex granules along the aging channel 323 and the dehydrated latex granules are being cut and mixed thoroughly through the cutting threads 325 such that the first dehydrated latex granules are fully and evenly mixed. When the first-stage dehydrated latex granules reach the second end 322 of the aging unit 320, a pressure of the first-stage dehydrated latex granules is increased to a level at which a pressure requirement for aging is fulfilled. In addition, a temperature at the second end 322 is controlled to increase through the heating unit 327. When the first-stage dehydrated latex granules at the second end 322 of the aging unit 320 are squeezed out through the nozzle 326 of the aging unit 320, a temperature of the first-stage dehydrated latex granules being squeezed out is further increased by fiction to a level at which a temperature requirement for aging is fulfilled. Accordingly, an aging process starts when both the temperature and pressure requirements are fulfilled. After the first-stage dehydrated latex granules are squeezed out of the nozzle 326 of the aging unit 320, the volatile compositions in the first-stage dehydrated latex are removed due to the dramatic decrease in pressure to form a second-stage processed latex material, which is thoroughly mixed without the defect of uneven or incomplete aging, is obtained.

Preferably, the aging machine 300 further comprises a cutting unit 330 comprising a cutter 331 positioned adjacent to the nozzle 326 of the aging unit 320 arranged for cutting the second-stage processed latex material into pieces to form an aged product of latex granules to increase surface area to volume ratio to facilitate cooling and further processing. In addition, the aging machine 300 comprises an exhaust unit 340 for gas passage.

The aged products of latex granules prepared through the above process by the initial processing machine are of high quality. It is worth mentioning that the volatile compositions are removed effectively and the aged products are dried and aged thoroughly. The aged products have a high quality level which exceeding the standard requirements. In other words, through the initial processing, it is possible to obtain high quality aged products of latex granules, namely the processed natural raw rubber.

As shown in FIG. 2 of the drawings, the aged products are then exited through the output 328 of the aging unit 320 to a conveyance unit 400 where at least one cooling fan 401 is provided for cooling the aged products.

In particular, step (f) comprises the following sub-steps:

(f.1) receiving the first pretreated latex granules through an aging machine 300;

(f.2) screw-pressing the first pretreated latex granules in such a manner that the pretreated latex granules are thoroughly cut and mixed while at the same time a temperature of the pretreated latex granules is increased and a pressure of the pretreated granules is increased to reach a level at which a pressure requirement for aging is met;

(f.3) further increasing the temperature of the first pretreated latex granules through a heater unit 327;

(f.4) further increasing the temperature to reach a level at which a temperature requirement for aging is met through passing through a nozzle of the aging machine 300; and (f.5) an aging process starts once the pressure and temperature requirements are met and a second-stage processed latex material is obtained.

After step (f.1), different additives may be added so that the second-stage processed latex material as obtained contains the additives which are evenly distributed in the latex material. Accordingly, different types of latex materials for different purposes may be prepared through the initial processing process by using different additives in the process.

In other words, after step (f.1), the process further comprises the step of: adding a preset additive into the first pretreated latex granules, whereby when the first pretreated granules go through subsequent steps of the process, the additive is first mixed thoroughly with the first pretreated granules and then undergo the process to evenly distributed in the second-stage processed latex material.

Accordingly, step (f) comprises the following sub-steps:

(f.1') receiving the first pretreated latex granules through an aging machine 300 and adding a preset additive into the first pretreated latex granules to form an additive-containing latex granules;

(f.2') screw-pressing the additive-containing latex granules in such a manner that the additive-containing latex granules are thoroughly cut and mixed while at the same time a temperature of the additive-containing latex granules is increased and a pressure of the additive-containing latex granules is increased to reach a level at which a pressure requirement for aging is met;

(f.3') further increasing the temperature of the additive-containing latex granules through a heater unit 327;

(f.4) further increasing the temperature to reach a level at which a temperature requirement for aging is met through passing through a nozzle of the aging machine 300; and (f.5) an aging process starts once the pressure and temperature requirements are met and a second-stage processed latex material is obtained.

It is worth mentioning that the second-staged dehydrated latex material has gone through the aging process thoroughly. The problem of uneven or incomplete aging is solved. In addition, if an additive is added before the aging process, the additive can be evenly distributed in the aged products, which is very advantageous for further processing.

Figure 4:
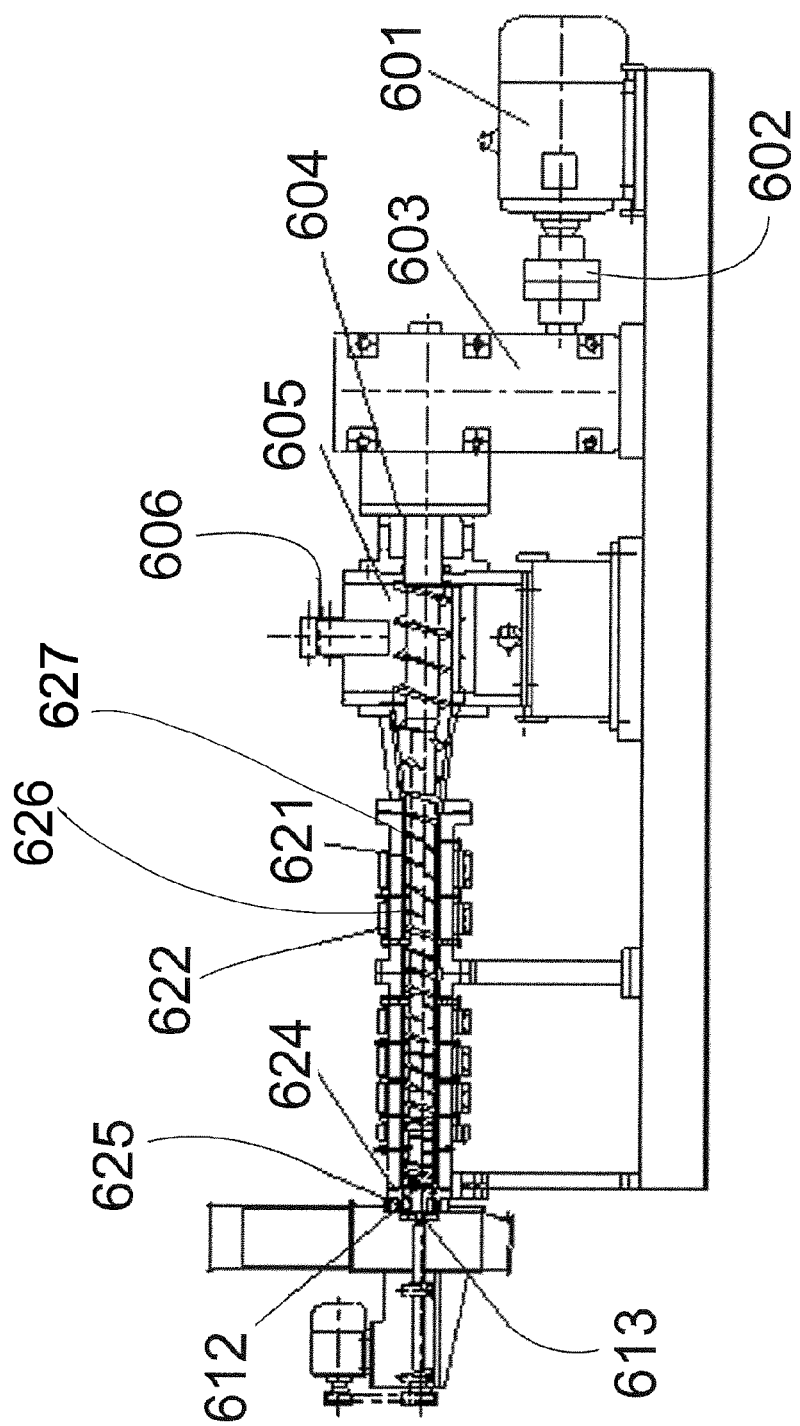
FIG. 4 is an illustration of an alternative embodiment of an initial processing machine for natural rubber according to the above preferred embodiment of the present invention.

Referring to FIG. 4 of the drawings, an alternative embodiment of the initial processing machine for natural rubber which is used to carrying out an automated process of initial processing of natural rubber according to the preferred embodiment is illustrated. The initial processing machine is a single-unit initial processing machine 600 which includes a de-watering component and an aging component.

As shown in FIG. 4, the single-unit initial processing machine 600, which is relatively compact in size, is arranged for providing an automated initial processing of natural rubber. In particular, the single-unit initial processing machine 600, which is powered through a motor 601 connecting to a reducer unit 603 through a coupling device 602, comprising an aging unit 620 arranged for providing an automated drying and aging process; a hopper unit 605 which is controlled through an input control 606 and is arranged for feeding raw materials into the aging unit 620; and a nozzle heating device 612 for providing additional heating effect to the aging unit 620.

In particular, the aging unit 620 has an elongated body 621 defining a channel 626 extended between a first end 623 and a second end 624, a screw shaft unit 627 coaxially provided in the channel 626, a water exit 628 positioned in the first end 623 for water drainage; a body heating unit 622 provided on the body 621 for heating, and a nozzle 625 at the second end 624. The nozzle heating device 612 is provided adjacent to the nozzle 625 such that the temperature at the nozzle can be increased through the nozzle heating device 612. The aging unit 600 connects to the power through a connector unit 604 provided at the first end 623 to which the screw shaft unit 627 is connected. Preferably, a cutter unit 613 is provided for cutting the processed materials output from the nozzle 625 of the aging unit 620.

Accordingly, as the coagulated latex is propelled along from the first end 623 to the second end 624 in the channel around the first end 623, the coagulated latex is dewatered through the screw shaft unit 627 towards the first end 623 to form a first pretreated latex materials while free water which is extracted from the coagulated latex is guided to flow out of the channel 626 through the water exit 628 through the pressure gradient built along the channel 626. As the first pretreated latex materials continue to propelled along the channel 626 towards the second end 624, the first pretreated latex materials are pressed and mixed to propel towards the second end 624 of the channel 626 through the shaft unit 627, both pressure and temperature are further increased during the process. Therefore, volatile compositions contained in the first pretreated latex materials are gasified and propel together with the first pretreated latex materials along the channel 626 to undergo the aging process. In addition, the first pretreated materials are being cut and mixed thoroughly through cutting threads of the shaft unit 627 such that the first pretreated materials are fully and evenly mixed. When the first pretreated latex materials reach the second end of the channel 626, a pressure requirement for aging is fulfilled. In addition, the body heating unit 622 which is provided on the body 621 further assist in maintaining or providing a temperature level to the channel 626 such that the first pretreated latex materials can be increased when required. When the first pretreated latex materials are squeezed out through the nozzle 625, a temperature requirement is fulfilled and the aging process starts. In other words, the first pretreated latex starts the aging process when both temperature and pressure requirements are fulfilled while squeezing out of the nozzle 625. Therefore, a fully and thoroughly mixed latex is resulted in which the defect of uneven or incomplete aging is avoided.

It is worth mentioning that the nozzle heating device 612 is arranged for providing additional heating at the nozzle in case the temperature requirement is not met throughout the process so as to ensure that the temperature requirement is met when the first pretreated latex materials reach and squeeze out of the nozzle.

The elongated body 621 comprises a tubular body portion 6211 at the first end 623 and a flat body portion 6212 at the second end 624, wherein the tubular body portion 6211 has an inclined bottom surface and the water exit 628 is provided in the bottom surface of the tubular body portion 6211, so that when the latex material is propelled along the screw shaft unit 627 from the first end 623 towards the second end 624, free water contained in the latex material is eliminated from the water exit 628 along the bottom surface of the tubular body portion 6211, and the latex material is then propelled from the tubular body portion 6211 into the flat body portion 6212 to undergo the aging process.

It is worth mentioning that a diameter of the cutting threads of the shaft unit 627 in the tubular body portion 6211 at the first end 623 can be relatively larger than a diameter of the cutting threads of the shaft unit 627 in the flat body portion 6212 at the second end 624, but a density of the cutting threads of the shaft unit 627 in the flat body portion 6212 at the second end 624 can be relatively larger than a density of the cutting threads of the shaft unit 627 in the tubular body portion 6211 at the first end 623.

Accordingly, when the latex material is fed into the elongated body 621 of the the single-unit initial processing machine 600 through the hopper unit 605, the latex material is cut and mixed thoroughly through cutting threads of the shaft unit 627 in the tubular body portion 6211, so that the latex material is dewatered to form a first pretreated latex materials while free water which is extracted from the coagulated latex is guided to flow out of the channel 626 through the water exit 628 through the pressure gradient built along the channel 626. As the first pretreated latex materials continue to propelled along the channel 626 towards the flat body portion 6212, both pressure and temperature are further increased during the process. Therefore, volatile compositions contained in the first pretreated latex materials are gasified and propel together with the first pretreated latex materials along the channel 626 in the flat body portion 6212 to undergo the aging process.

In other words, the single-unit initial processing machine 600 comprises a dewatered part which is the tubular body portion 6211 and an aging part which is the flat body portion 6212, the shaft unit 627 is extended in the tubular body portion 6211 and the flat body portion 6212. The latex material undergoes a de-watering process in the tubular body portion 6211 at the first end 623 and an aging process in the flat body portion 6212 at the second end 624. Accordingly, the single-unit initial processing machine 600 can achieve both the de-watering process and the aging process. In comparison with the initial processing machine which has a de-watering machine 200 and an aging machine 300 in the above preferred embodiment, the occupying room of the machine is reduced, and an intermidate step of transferring the latex material between the de-watering machine 200 and an aging machine 300 is eliminated. The single-unit initial processing machine 600 can achieve a substantial same purification procedure as the the initial processing machine which has a de-watering machine 200 and an aging machine 300, so that a period of time required for a single circle of the initial process and the cost are both reduced.

Figure 5:
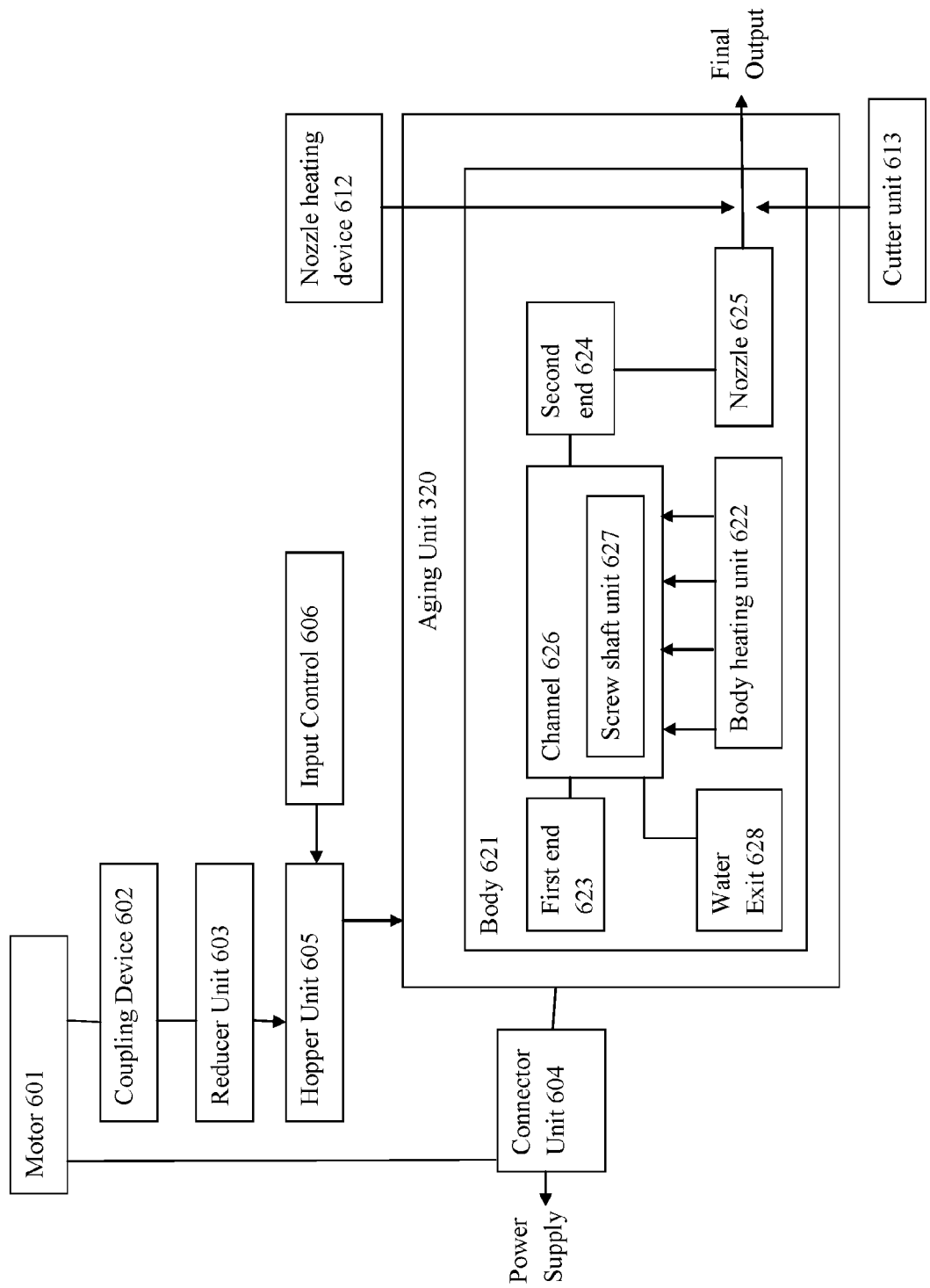
FIG. 5 is a schematic diagram of an alternative embodiment of an initial processing machine for natural rubber for carrying out a process of initial processing of natural rubber according to the above preferred embodiment of the present invention.
Figure 6:
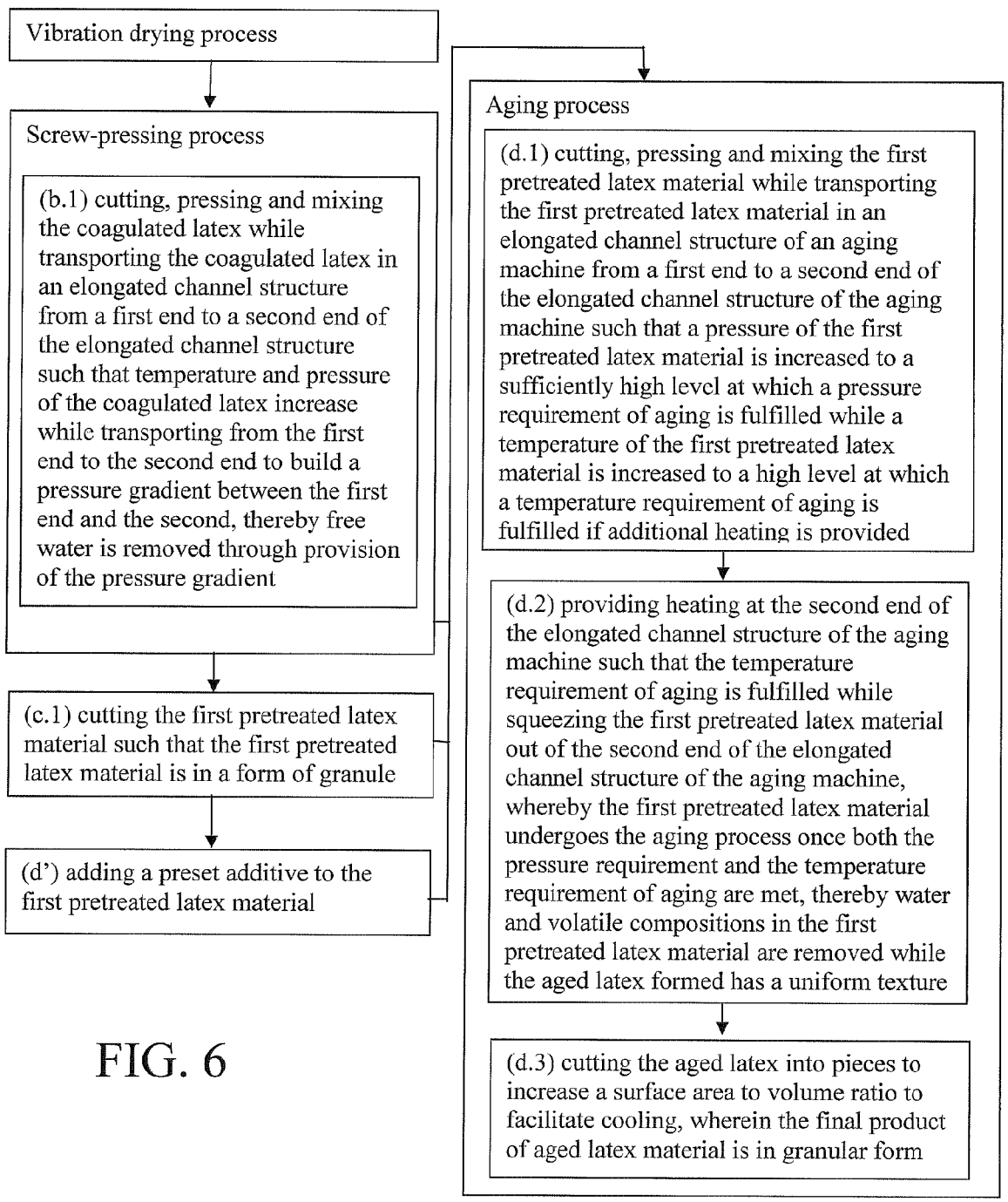
FIG. 6 is a schematic diagram of a two-step de-watering process carried out through an initial processing machine for natural rubber according to the above preferred embodiment of the present invention.

Referring to FIGS. 4 and 5 of the drawings, the present invention provides a method of drying through an aging process to produce a processed natural raw rubber, comprising the steps of:

(a) providing the coagulated latex which contains water, preferably in the form of latex granules;

(b) dewatering the coagulated latex through screw-pressing at a preset temperature to form a first pretreated latex materials; and (c) aging the first pretreated latex materials from step (b) to form an aged latex.

Preferably, the method of drying through aging further comprises the step of:

(d) cutting the aged latex from step (c) to form aged latex granules.

It is worth mentioning that the method is an automated method which is suitable for mass production. The coagulated latex which contains water, preferably in the form of latex granules, is fed into the hopper unit 605 to enter into the process. Free water is removed through screw-pressing with the screw shaft unit 627 around the first end 623 where the free water being removed is guided to exit through the water exit 628. As the coagulated latex is propelled along the screw shaft unit 627 in the first end 623, pressure and temperature are increased accordingly and a pressure gradient along the channel 626 is built where the pressure towards the first end 623 is lower than that of the second end 624. The minimum pressure is obtained at a position towards the hopper unit 605 in the first end 623 and therefore the water exit 628 is preferably to positioned at a position at which a minimum pressure is obtained.

As the coagulated latex continues to propel along the screw shaft unit 627 from the first end 623 to the second end 624, the temperature of the latex continues to increase through screw-pressing and cutting process along the screw shaft unit 627. In addition, additional heating is provided through the body heating unit 622 such that the temperature required for melting the latex is met while thorough mixing effect is provided through the continuous screw-pressing and cutting process along the screw shaft unit 627. When the latex reaches the nozzle 625 inside the channel 626 at the second end 624, the pressure requirement for aging is met, which is about 15-20 MPa. Additional temperature increase is provided through fiction when the latex squeezes through the nozzle 625 as well as additional heating by the nozzle heating device 612 such that the temperature requirement for aging, which is 140-180° C., is met. Accordingly, the aging process starts as the latex is squeezed out of the nozzle 625. Once the latex leaves the nozzle 625, water and other volatile compositions contained in the latex are released or removed effectively from the latex due to the dramatic decrease in pressure. Then, the cutter unit 613 around the nozzle 625 is arranged for cutting the latex into pieces to form an aged product of latex granules to increase surface area to volume ratio to facilitate cooling and further processing. In other words, the initial processed aged product of latex has undergone a de-watering process, an aging process and a purification process through which volatile impurities are removed.

It is worth mentioning that the additional heating by the nozzle heating device 612 may not be required when the temperature requirement for aging is attained when the latex is squeezed out of the nozzle 625.

It is worth mentioning that the drying process for initial processing of natural raw rubber is capable of being carried out through the machine as shown in FIGS. 2 and 4 of the drawings. In particular, referring to FIGS. 1 to 6 of the drawings, the process comprises the steps of: comprising (a) providing a coagulated latex, wherein the coagulated latex contains water and volatile compositions; (b) dewatering the coagulated latex through a screw-pressing process such that free water is removed; (c) forming a first pretreated latex material; (d) aging the first pretreated latex material through an aging process such that water and volatile compositions are removed; and (e) forming an aged product of aged latex material.

In the step (b), the screw-pressing process comprises the steps of: (b.1) cutting, pressing and mixing the coagulated latex while transporting the coagulated latex in an elongated channel structure from a first end to a second end of the elongated channel structure such that temperature and pressure of the coagulated latex increase while transporting from the first end to the second end to build a pressure gradient between the first end and the second, thereby free water is removed through provision of the pressure gradient.

In the step (d), the aging process comprises the steps of: (d.1) cutting, pressing and mixing the first pretreated latex material while transporting the first pretreated latex material in an elongated channel structure of an aging machine from a first end to a second end of the elongated channel structure of the aging machine such that a pressure of the first pretreated latex material is increased to a sufficiently high level at which a pressure requirement of aging is fulfilled while a temperature of the first pretreated latex material is increased to a high level at which a temperature requirement of aging is fulfilled if additional heating is provided; and (d.2) providing heating at the second end of the elongated channel structure of the aging machine such that the temperature requirement of aging is fulfilled while squeezing the first pretreated latex material out of the second end of the elongated channel structure of the aging machine, whereby the first pretreated latex material undergoes the aging process once both the pressure requirement and the temperature requirement of aging are met, thereby water and volatile compositions in the first pretreated latex material are removed while the aged latex formed has a uniform texture. Preferably, after the step (d.2), the process further comprises a step of: (d.3) cutting the aged latex into pieces to increase a surface area to volume ratio to facilitate cooling, wherein the aged product of aged latex material is in granular form.

When the single-unit initial processing machine 600 is used, the elongated channel structure for the screw-pressing process in step (b) and for the aging process in step (d) respectively are provided through the aging unit 620 of the initial processing machine 600.

In particular, as shown in FIG. 4 of the drawings, the single-unit initial processing machine 600 is compact in size, capable of initial processing natural raw rubber through drying and aging to form an aged product, which is the initial processed raw rubber materials. In other words, the energy requirement is further reduced in proportional to the size reduction in the single-unit initial processing machine 600.

It is worth mentioning that the temperature increase mechanism to fulfill the temperature requirement for aging is not solely achieved by external heating. The temperature increase mechanism to fulfill the temperature requirement for aging of the present invention makes use of the heat generation during the process, supplementary external heating, and heating at a particular point, which is at the nozzle, such that energy consumption is maintained at a lowest level. In other words, energy use is dramatically decrease both directly through shorten processing time and indirectly through providing specific temperature increase mechanism.

The automated process is not only energy saving and time efficient, but also capable of providing high quality aged product with flexibilities in the form and shape of the product. In addition, additive for further processing can be added evenly into the aged product, which is particularly advantageous for subsequent processing of the resulting products of raw rubber materials of the present invention.

The present invention further provides a single-unit initial processing machine 600 according to an embodiment, as shown in FIGS. 7-10. It is different with the above embodiment that the processing machine 600 further comprises an additional conveyance unit 400' connected with an end of the aging unit 620 in other to further dry the product to ensure the quality of the rubber. Preferably, the conveyance unit 400' is connected to the second end 624 of the channel 626 to receive an aged product 101 of processed raw rubber processed by the processing machine 600 to further provide drying and cooling steps.

It is worth to mention that the aged product 101 has moisture content higher than 9% which is semi-product raw rubber needed to be further dewatered.

Figure 7:
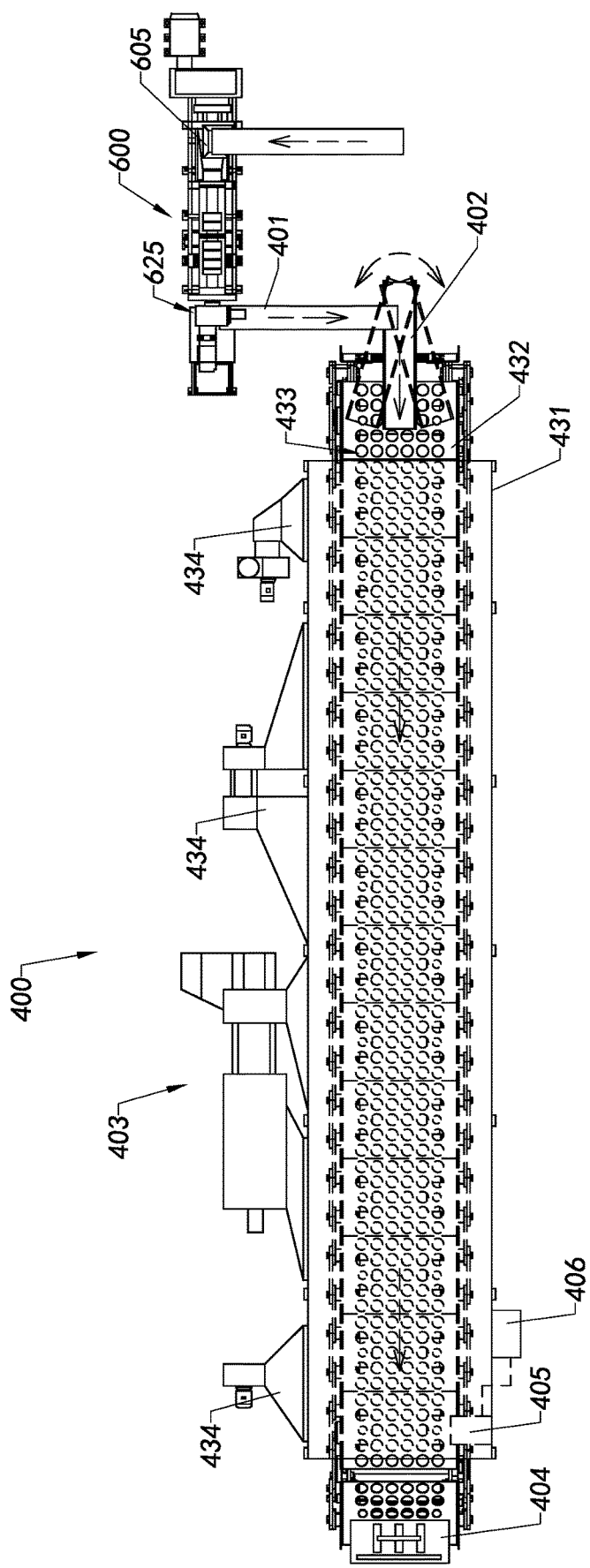
FIG. 7 is a top view of an additional conveyance unit and a machine for initial processing of natural raw rubber according to an embodiment of the present invention.
Figure 8:
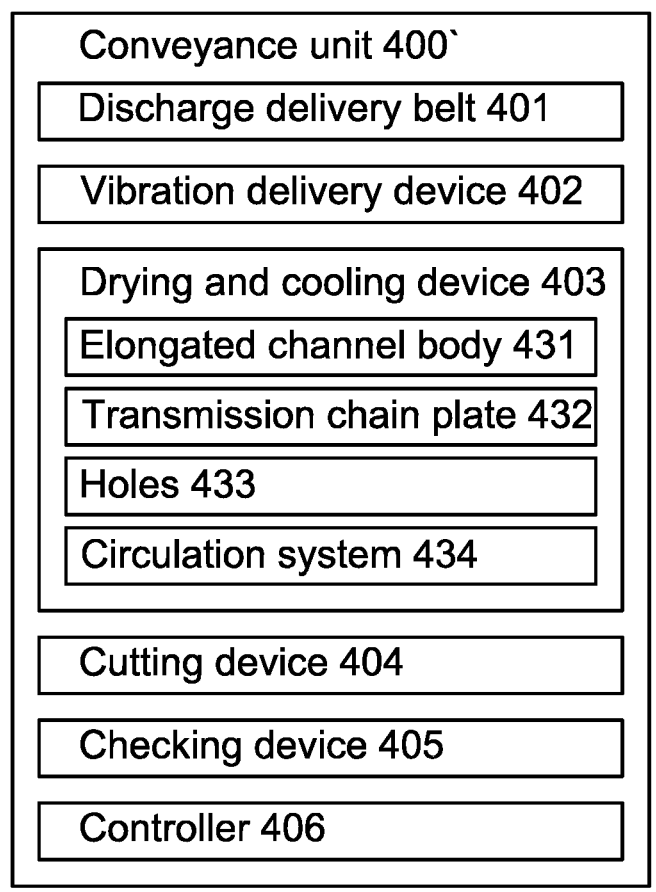
FIG. 8 is a schematic diagram of the conveyance unit according to the above preferred embodiment of the present invention.

The conveyance unit 400' comprises a discharge delivery belt 401 directly and movably connected with the aging unit 620, a vibration delivery device 402 adjacent to the discharge delivery belt 401, a drying and cooling device 403 adjacent to the vibration delivery device 402 and a cutting device 404, wherein one end of the drying and cooling device 403 is connected with the vibration delivery device 402 and the other end is connected with the cutting device 404. As shown in FIGS. 7 and 8, the drying and cooling device 403 has an elongated channel for receiving the aged product 101 therein. The aged product 101 is transmitted from the vibration delivery device 402 and the discharge delivery belt 401 and travels in a predetermined time period to be dried and cooled inside the drying and cooling device 403. After long time travel while being dewatered processed in the drying and cooling device 403, the aged product 101 becomes a dried product 102, and then being cooled processed in the drying and cooling device 403 becomes a final product 103 to be cut into proper size for packaging.

The aged product 101 is output from the nozzle 625 of the initial processing machine 600 and be received onto the discharge delivery belt 401. Preferably, the discharge delivery belt 401 has height difference with the second end 624 of the elongated channel 626, so that the aged product 101 falls on the discharge delivery belt 401 to be transferred forward. The discharge delivery belt 401 is driven to move in high speed which helps the aged product 101 to move towards the vibration delivery device 402 to prevent from being blocking or accumulating. In one embodiment, the height of the discharge delivery belt 401 can be adjusted while moving to be closely connected with the nozzle 625 to have as many aged products 101 as possible to prevent the foam of rubber being spilling. The discharge delivery belt 401 is made of material that has high temperature resistant.

The vibration delivery device 402 is connected between the discharge delivery belt 401 and the drying and cooling device 403 to pass the aged product 101 from the discharge delivery belt 401 to the drying and cooling device 403. The vibration delivery device 402 can be controlled to transfer the aged product 101 in forward or backward direction while providing vibration or swing in right and left directions. When there is unqualified product generated during the start-up or occasional shutdown of the initial processing machine 600, the unqualified product can move in backward direction by the vibration delivery device 402 to select qualified aged product 101 into the drying and cooling device 403. Since only qualified aged product 101 can be delivered into the drying and cooling device 403, the dried product 102 exited from the drying and cooling device 403 is well processed without impurities or non-uniform quality.

The swing or vibrating angle of the vibration delivery device 402 can be adjusted to ensure the uniformity of the interval space between products.

Figure 9:
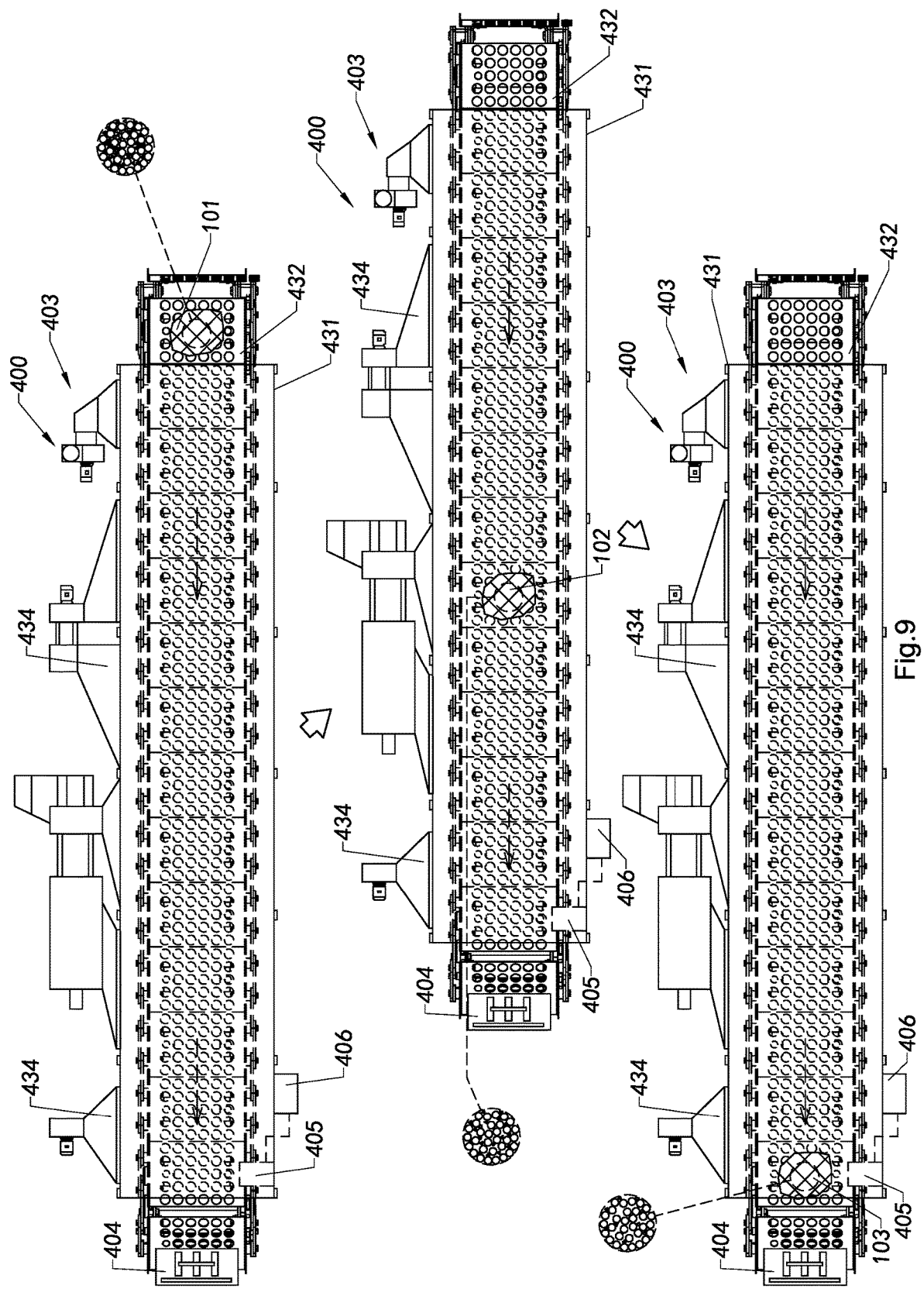
FIG. 9 is a top view of the conveyance unit processing the rubber from aged product into aged product according to the above preferred embodiment of the present invention
Figure 10:
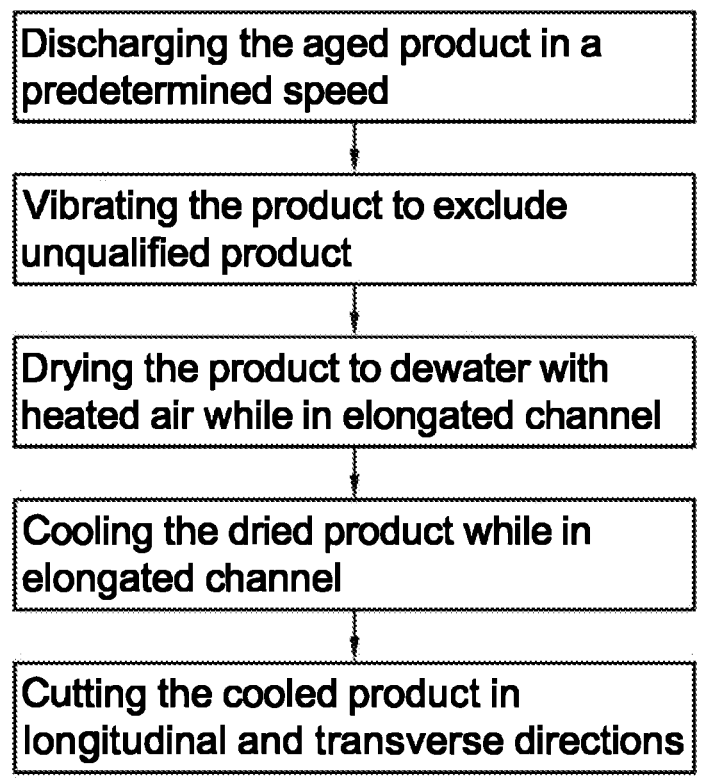
FIG. 10 is a flow chart of the dewatering processing method of an additional further process provided of the conveyance unit according to the above preferred embodiment of the present invention.

The drying and cooling device 403 comprises an elongated channel body 431, a transmission chain plate 432 and a circulation system 434. As shown in FIGS. 7 and 9, the elongated channel body 431 has an enter end and an exit end, wherein the enter end is connected with the vibration delivery device 402, and the exit end is provided with the cutting device 404 thereon. The enter end of the drying and cooling device 403 receives the aged product 101 from the vibration delivery device 402, and the exit end output the dried product 102. The drying and cooling device 403 firstly provide hot wind to dewater the aged product 101, then to cool down the temperature of the dried product 102 in the elongated channel body 431.

The transmission chain plate 432 is movable arranged in the elongated channel body 431 to carry the aged product 101 passing through the elongated channel body 431 from the enter end towards the exit end. The circulation system 434 provides circulating air inside the elongated channel body 431. Especially, the circulation system 434 provides a hot wind portion in the entering part of elongated channel body 431 to dewater the aged product 101. Preferably, the length of entering portion can be 40% of the whole elongated channel body 431 to fully dry the aged product 101 travelling by the transmission chain plate 432. According to the type of the raw rubber, the length of the hot wind area can be adjusted, preferably from 30% to 70%. In one embodiment, the circulation system 434 provides cool wind in the exiting part of the elongated channel body 431. The transmission chain plate 432 has a plurality of holes 433 for ventilation, so that the temperature of the product can be effected from top to bottom. In other words, the aged product 101 is firstly to be dewatered while in the hot wind to be dried product 102 in the channel body 431 and then to be cool down also in the channel body 431. As shown in FIG. 9, the product continuously moves in the channel body 431 without staying, which can ensure that the raw rubber are heated evenly but not too hot. The temperature and the blowing rate of hot wind inside the drying and cooling device 403 are automatically controllable. The conveyance unit 400' further comprises a controller 406 electrically connected with the drying and cooling device 403.

The dried product 102 has moisture content lower than 0.4% after out of the hot wind portion. Then the temperature of the dried product 102 is cool down lower than 60° C. after output of the exit end of the channel body 431. The aged product 101 is heated to be melt to caking together and then be cooled to be completely dewatered. The cutting device 404 is arranged on the exit end of the channel body 431, so that the dried product 102 is cut into pieces to be final product 103. Preferably, the cutting device 404 cut the integrated rubber in longitudinal and transverse directions to form the final product 103 has size slightly smaller than the size of press block.

Preferably, the transmission chain plate 432 is made of stainless steel. The cutting device 404 is provided upon the transmission chain plate 432.

The conveyance unit 400' further comprises a checking device 405 connected with the cutting device 404. The checking device 405 detects the performance of the final product 103 to pick out the unqualified product before packaging. The detecting performance of the final product 103 preferably is selected from: volatile matter<0.4%, PO (initial plastic value)>37, PRI (plastic retention rate)>100%, mooney viscosity 60-67, nitrogen content<0.4%.

The dewatering processing method of the conveyance unit 400', for further processing natural raw rubber after aging process, comprising the steps of:

Receiving and delivering the aged rubber in a predetermined speed via a discharge delivery belt;

Vibrating and delivering the rubber by a vibration delivery device;

Drying the product to dewater with heated air while being transmitted in an elongated channel of a drying and cooling device;

Cooling the dried rubber while being transmitted in the elongated channel of the drying and cooling device; and Cutting the cooled rubber in longitudinal and transverse directions.

Furthermore, the aged rubber is driven to move in high speed to prevent from being blocking or accumulating.

The step of vibrating is capable of excluding unqualified product generated during the start-up or occasional shutdown of the initial processing machine 600. Especially, the unqualified product can move in backward direction to be excluded. Thus, the step of drying is operated for qualified product to decrease unnecessary power consumption and processing time.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A drying machine for initial processing of natural raw rubber, comprising:
   a de-watering machine dewatering a coagulated latex, which contains water and volatile compositions, through a screw-pressing process to remove free water liquid and form a first pretreated latex material in solid form;
   an aging machine aging said first pretreated latex material through an aging process in such a manner that water and volatile compositions in gasified formed are removed due to pressure accumulation and subsequent dramatic decrease in pressure to form an aged latex, wherein said first pretreated coagulated latex is transported along an elongated channel structure of said aging machine from a first end to a second end, wherein a pressure along said elongated channel structure is increased and that, at said second end of said elongated channel structure, heat is provided such that water and volatile compositions in said first pretreated latex material are removed while said aged latex formed has a uniform texture to produce an aged product of aged latex material; and
   a conveyance unit connected to said second end of said elongated channel to receive said aged product of processed raw rubber processed by said processing machine to further provide drying and cooling steps to produce a final product, wherein said conveyance unit further comprises a discharge delivery belt directly and movably connected with said aging machine, a vibration delivery device adjacent to said discharge delivery belt, a drying and cooling device adjacent to said vibration delivery device and a cutting device, wherein one end of said drying and cooling device is connected with said vibration delivery device and the other end thereof is connected with said cutting device.

2. The drying machine, as recited in claim 1, wherein said discharge delivery belt is driven to move to receive said aged product from said aging machine.

3. The drying machine, as recited in claim 2, wherein said discharge delivery belt has height difference with said second end of said elongated channel, so that said aged product falls on said discharge delivery belt.

4. The drying machine, as recited in claim 2, wherein a height of said discharge delivery belt is adjustable while moving to be closely connected with said second end of said elongated channel.

5. The drying machine, as recited in claim 1, wherein said vibration delivery device is controlled to transfer said aged product in forward or backward direction while providing vibration or swing in right and left to pass said qualified aged product from said discharge delivery belt to said drying and cooling device.

6. The drying machine, as recited in claim 2, wherein said vibration delivery device is controlled to transfer said aged product in forward or backward direction while providing vibration or swing in right and left to pass said qualified aged product from said discharge delivery belt to said drying and cooling device.

7. The drying machine, as recited in claim 3, wherein said vibration delivery device is controlled to transfer said aged product in forward or backward direction while providing vibration or swing in right and left to pass said qualified aged product from said discharge delivery belt to said drying and cooling device.

8. The drying machine, as recited in claim 4, wherein said vibration delivery device is controlled to transfer said aged product in forward or backward direction while providing vibration or swing in right and left to pass said qualified aged product from said discharge delivery belt to said drying and cooling device.

9. The drying machine, as recited in claim 1, wherein said drying and cooling device further comprises an elongated channel body, a transmission chain plate and a circulation system, wherein said elongated channel body has an enter end and an exit end, wherein said enter end is connected with said vibration delivery device, and said exit end is provided with said cutting device thereon, wherein said enter end of said drying and cooling device receives said aged product from said vibration delivery device, and said exit end output said dried product to said cutting device, wherein transmission chain plate is movable arranged in said elongated channel body to carry said aged product passing through said elongated channel body from said enter end towards said exit end.

10. The drying machine, as recited in claim 9, wherein said drying and cooling device firstly provide hot wind to dewater said aged product continuously moves in said channel body without staying, then to cool down a temperature of said dried product inside said elongated channel body.

11. The drying machine, as recited in claim 9, wherein said transmission chain plate has a plurality of holes for ventilation.

12. The drying machine, as recited in claim 9, wherein said transmission chain plate is made of stainless steel.

13. The drying machine, as recited in claim 5, wherein said drying and cooling device further comprises an elongated channel body, a transmission chain plate and a circulation system, wherein said elongated channel body has an enter end and an exit end, wherein said enter end is connected with said vibration delivery device, and said exit end is provided with said cutting device thereon, wherein said enter end of said drying and cooling device receives said aged product from said vibration delivery device, and said exit end output said dried product to said cutting device, wherein transmission chain plate is movable arranged in said elongated channel body to carry said aged product passing through said elongated channel body from said enter end towards said exit end.

14. The drying machine, as recited in claim 13, wherein said drying and cooling device firstly provide hot wind to dewater said aged product continuously moves in said channel body without staying, then to cool down said temperature of said dried product inside said elongated channel body.

15. The drying machine, as recited in claim 13, wherein said transmission chain plate has a plurality of holes for ventilation.

16. The drying machine, as recited in claim 8, wherein said drying and cooling device further comprises an elongated channel body, a transmission chain plate and a circulation system, wherein said elongated channel body has an enter end and an exit end, wherein said enter end is connected with said vibration delivery device, and said exit end is provided with said cutting device thereon, wherein said enter end of said drying and cooling device receives said aged product from said vibration delivery device, and said exit end output said dried product to said cutting device, wherein transmission chain plate is movable arranged in said elongated channel body to carry said aged product passing through said elongated channel body from said enter end towards said exit end.

17. The drying machine, as recited in claim 16, wherein said drying and cooling device firstly provide hot wind to dewater said aged product continuously moves in said channel body without staying, then to cool down said temperature of said dried product inside said elongated channel body.

18. The drying machine, as recited in claim 16, wherein said transmission chain plate has a plurality of holes for ventilation.

\* \* \* \* \*